US011244588B2

(12) United States Patent
Atkinson et al.

(10) Patent No.: US 11,244,588 B2
(45) Date of Patent: Feb. 8, 2022

(54) CONTROLLING REFRESHES OF PIXELS IN DISPLAY DEVICES

(71) Applicant: Hewlett-Packard Development Company, L.P., Spring, TX (US)

(72) Inventors: Lee Atkinson, Taipei (TW); Cheng-Hua Yu, Taipei (TW)

(*) Notice: Subject to any disclaimer, the term of this patent is extended or adjusted under 35 U.S.C. 154(b) by 0 days.

(21) Appl. No.: 16/980,500

(22) PCT Filed: Apr. 24, 2018

(86) PCT No.: PCT/US2018/029016
§ 371 (c)(1),
(2) Date: Sep. 14, 2020

(87) PCT Pub. No.: WO2019/209258
PCT Pub. Date: Oct. 31, 2019

(65) Prior Publication Data
US 2021/0035481 A1    Feb. 4, 2021

(51) Int. Cl.
*G09G 3/20* (2006.01)
*G02B 27/01* (2006.01)
*G06F 3/01* (2006.01)
*G06F 3/0488* (2013.01)

(52) U.S. Cl.
CPC ............. *G09G 3/20* (2013.01); *G02B 27/017* (2013.01); *G06F 3/013* (2013.01); *G06F 3/0488* (2013.01); *G09G 2310/027* (2013.01)

(58) Field of Classification Search
CPC .. G09G 3/3618; G09G 2310/027; G09G 3/20; G02B 27/017
See application file for complete search history.

(56) References Cited

U.S. PATENT DOCUMENTS

| 5,206,633 A * | 4/1993 | Zalph ................... G09G 3/2011 345/904 |
| 7,389,432 B2 | 6/2008 | Chandley et al. |
| 8,049,713 B2 | 11/2011 | Sampsell |
| 9,141,264 B2 | 9/2015 | Bhogal et al. |
| 2008/0001934 A1 * | 1/2008 | Wyatt .................. G09G 3/3648 345/204 |
| 2008/0024481 A1 | 1/2008 | Lee et al. |
| 2010/0245547 A1 * | 9/2010 | Tanaka ................. H04N 13/139 348/51 |

(Continued)

*Primary Examiner* — Kent W Chang
*Assistant Examiner* — Chayce R Bibbee
(74) *Attorney, Agent, or Firm* — Tong Rea Bentley & Kim LLC (57) ABSTRACT

A display device includes pixels, a serial-to-parallel converter (SPC), a row driver, a column driver, and a switch. The pixels are arranged in rows and columns which include a first column and a first row. A first pixel resides at an intersection of the first row and first column. The SPC extracts, from a signal sent by a graphics controller, pixel data and a command. The row driver initiates a refresh of the pixels residing in the first row based on the pixel data. The column driver transmits the pixel data to the first column. During the refresh, the switch allows transmission of the pixel data to the first pixel when the command indicates that the first pixel is to be refreshed and prevents transmission of pixel data to the first pixel when the command indicates that the first pixel is not to be refreshed.

20 Claims, 5 Drawing Sheets

(56) References Cited

U.S. PATENT DOCUMENTS

| | | | | |
|---|---|---|---|---|
| 2011/0043644 A1* | 2/2011 | Munger | ............ | H04N 5/23296 348/207.1 |
| 2014/0104243 A1* | 4/2014 | Sakariya | ................... | G06F 3/14 345/204 |
| 2015/0179109 A1* | 6/2015 | Hsu | ........................ | G02F 1/167 345/107 |
| 2015/0179150 A1 | 6/2015 | Andrysco et al. | | |

* cited by examiner

CONTROLLING REFRESHES OF PIXELS IN DISPLAY DEVICES

BACKGROUND

Many display applications, including virtual reality (VR) applications that use head mounted displays (VR HMDs), obtain pixel data from a remote graphics controller. The remote graphics controller sends information for display in a plurality of packets, where each packet includes display data (e.g., red, green, and blue display levels) for one pixel of the display device.

DETAILED DESCRIPTION

The present disclosure broadly describes an apparatus, method, and non-transitory computer-readable medium for using switches in display devices to control refreshes of pixels. As discussed above, many display applications, including virtual reality (VR) applications that use head mounted displays (VR HMDs), obtain pixel data from a remote graphics controller. The remote graphics controller sends information for display in a plurality of packets, where each packet includes display data (e.g., red, green, and blue display levels) for one pixel of the display device. Each packet is transmitted over a link (e.g., a wired cable or wireless network connection) between the remote graphics controller and the display device. Display devices that operate on volatile memory typically refresh their display images constantly (e.g., several times per second); thus the transmission of display data to the display device is constant.

The amount of link bandwidth consumed by the transmission of the packets is a function of the pixel count, the color depth, and the frame rate of the pixel data. As an example, the bandwidth consumed by transmitting pixel data to an HMD may be approximately twenty gigabits per second. As the amount of link bandwidth consumed approaches the total available link bandwidth, transmission of display data between the remote graphics controller and the display device may be slowed, resulting in a reduction in image fidelity. In addition, constantly refreshing an entire image may cause the display device to consume a great deal of power (e.g., in a liquid crystal display device, the refresh of a pixel may be accompanied by an alternate polarity drive to the pixel, which increases power consumption).

Examples of the present disclosure reduce the link bandwidth consumed when transmitting pixel data from a remote graphics controller to a display device by allowing the refresh rate of individual pixels of a display device to be varied. That is, each pixel of the display device may be selectively refreshed or not refreshed during an image refresh operation of the display device. Thus, refresh of all pixels of a display device may be avoided. In one example, column drivers that drive pixels in corresponding columns of the display device include switches which allow for the selective transmission of pixel data to individual pixels in the columns (e.g., to allow for refresh of the individual pixels). A command included in the pixel data transmitted by the remote graphics controller may control whether a switch is closed to allow transmission of pixel data or open to prevent transmission of pixel data. As such, amount of data transmitted on the link between the remote graphics controller and the display device may be minimized, thereby conserving link bandwidth. In addition, the power consumption of the display device may be reduced by reducing the number of pixels that are refreshed during each image refresh operation.

Examples of the disclosed approach may reduce the image fidelity in areas of a display image where pixel data is not refreshed; however, the reduction in fidelity may be limited to regions of the display image located on the periphery of a viewers gaze. As such, examples of the present disclosure may be well suited to display applications that make use of foveated rendering techniques (i.e., techniques that track a viewers gaze and render portions of an image outside the center of the gaze at a lower fidelity to reduce power consumption and improve performance). For instance, examples of the present disclosure may be used to render images on head mounted displays.

Examples of the present disclosure may also be used to render images on non-VR displays as well as displays that receive pixel data from a local graphics controller, including televisions, computer monitors, and other display devices for which link bandwidth between the display device and a remote image source may be limited and/or in which a reduction in power consumption may be beneficial. In this case, it may be determined that the fidelity of certain pixels does not decrease significantly when a less frequent refresh rate is implemented. For instance, a pixel displaying "white" may be at a stable state that can avoid a constant refresh, whereas a pixel displaying "gray" may benefit from a relatively more frequent refresh to avoid flicker.

Figure 1:
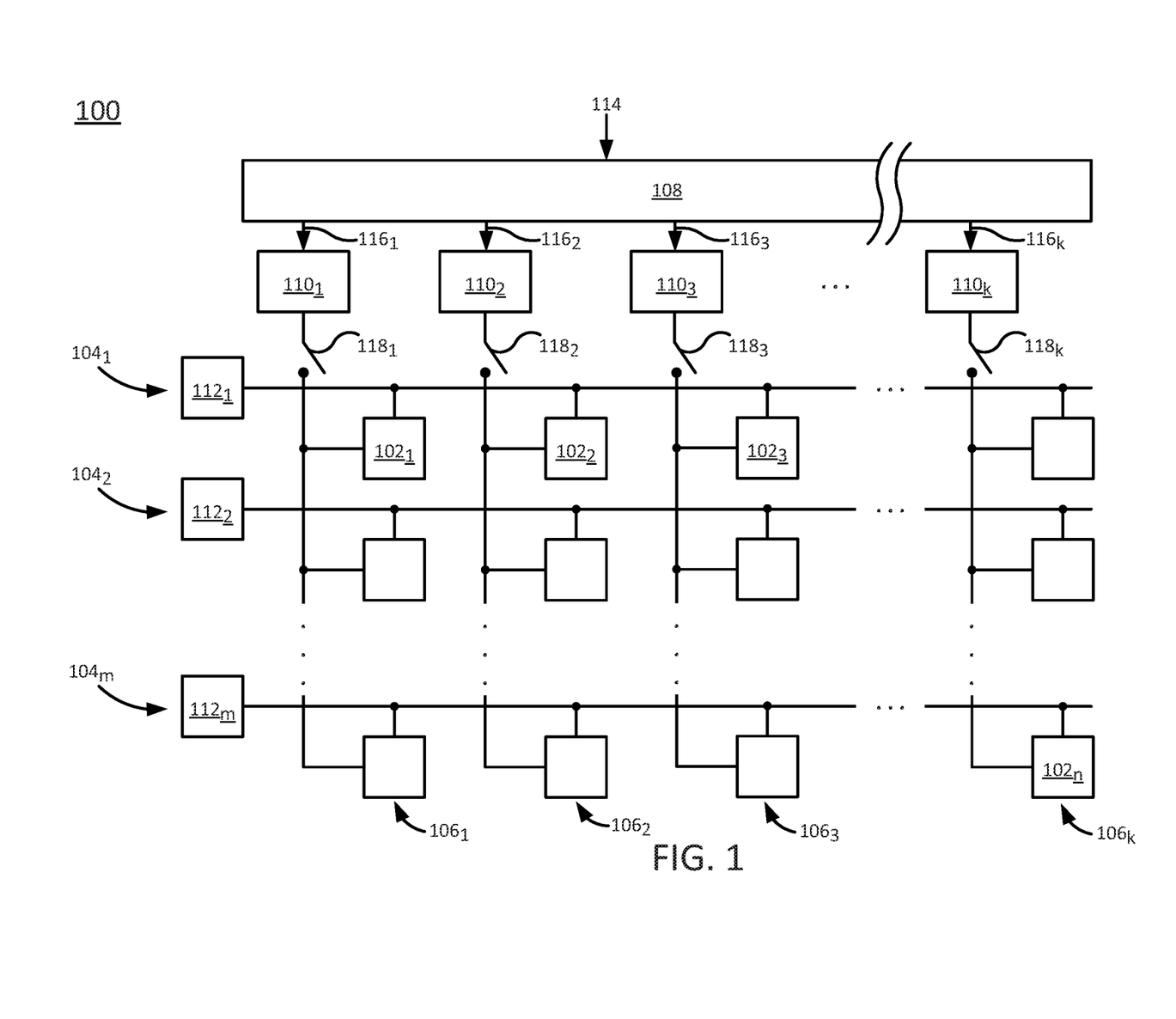
FIG. 1 depicts a high-level block diagram of an example display device of the present disclosure.

FIG. 1 depicts a high-level block diagram of an example display device 100 of the present disclosure. In one example, the display device 100 includes a plurality of pixels $102_1$-$102_n$ (hereinafter individually referred to as a "pixel 102" or collectively referred to as "pixels 102"). The plurality of pixels 102 includes at least a first pixel $102_1$ and a second pixel $102_2$. In one example, each pixel 102 is controllable to display a different color, where the color displayed by a pixel 102 may be represented by a plurality of component intensities, such as red, green, and blue (RGB) component intensities or cyan, magenta, yellow, and black (CMYK) component intensities.

The plurality of pixels is arranged in a plurality of rows $104_1$-$104_m$ (hereinafter individually referred to as a "row 104" or collectively referred to as "rows 104") and a plurality of columns $106_1$-$106_k$ (hereinafter individually referred to as a "column 106" or collectively referred to as "columns 106"). The plurality of rows 104 includes at least a first row $104_1$ and a second row $104_2$, while the plurality of columns 106 includes at least a first column $106_1$ and a second column $106_2$. The number of rows 104 may or may not be equal to the number of columns 106, depending on the display device. For example, for an HMD, the display typically includes fewer rows than columns. In one example, one pixel of the plurality of pixels resides at each intersection of a row 104 and column 106. For instance, the first pixel $102_1$ resides at the intersection of the first row $104_1$ and the first column $106_1$.

Each row 104 is controlled by a respective row driver $112_1$-$112_m$ (hereinafter individually referred to as a "row driver 112" or collectively referred to as "row drivers 112"). For instance, a plurality of row drivers 112 may include a first row driver $112_1$ corresponding to the first row $104_1$, a second row driver $112_2$ corresponding to the second row $104_2$, and so on. The row driver 112 for a given row 104 drives a command that causes the pixels 102 residing in the given row 104 to render pixel data (e.g., to be "refreshed") in accordance with pixel data extracted from a first signal 114 from a graphics controller (e.g., a local graphics controller or a remote graphics controller coupled to the display device via a wires or wireless network link).

Similarly, each column 106 is controlled by a respective column driver $110_1$-$110_k$ (hereinafter individually referred to as a "column driver 110" or collectively referred to as "column drivers 110"). For instance, a plurality of column drivers 110 may include a first column driver $110_1$ corresponding to the first column $106_1$, a second column driver $110_2$ corresponding to the second column $106_2$, and so on. The column driver 110 for a given column 106 transmits the pixel data for a pixel 102 in the given column 106 to the pixel 102 when the row 104 in which the pixel 102 resides is being refreshed. In one example, the plurality of column drivers 110 comprises a plurality of digital-to-analog converters (DACs).

The display device 100 further includes a serial-to-parallel converter (SPC) 108 and a plurality of switches $118_1$-$118_k$ (hereinafter individually referred to a "switch 118" or collectively referred to as "switches 118"). The SPC 108 is configured to extract serial pixel data from the first signal 114 sent by the graphics controller and to digitally convert the serial pixel data 118 to parallelized pixel data, which is subsequently converted by the column drivers 110 to analog values. Additionally, the SPC 108 is configured to extract commands from the first signal 114 that indicate the refresh statuses of the pixels 102 (i.e., whether or not particular pixels 102 are to be refreshed), as discussed in further detail below. The parallelized pixel data 116 and/or the refresh statuses is sent by the SPC 108 to the column drivers 110 of the columns 106 in which the corresponding pixels 102 reside, e.g., in a plurality of second signals $116_1$-$116_k$ (hereinafter individually referred to as a "signal 116" or collectively referred to as "signals 116").

Each switch 118 of the plurality of switches 118 is coupled between a column driver 110 and the column 106 of pixels 102 that is driven by the column driver 110. Thus, the plurality of switches includes at least a first switch $118_1$ corresponding to the first column driver $110_1$ and first column $106_1$, and a second switch $118_2$ corresponding to the second column driver $110_2$ and the second column $106_2$. Each switch 118 is configured to selectively transmit pixel data to a corresponding column 106, based on a command extracted by the SPC 108 as discussed above, so that a pixel 102 in the corresponding column 106 will refresh or not refresh as dictated by the graphics controller. In one example, when a switch 118 is closed, this allows the corresponding column driver 110 to transmit pixel data to a pixel 102 that resides in the column 106, thereby changing the state of the pixel 102 (e.g., "refreshing" the pixel) in accordance with the pixel data. However, when the switch 118 is open, this prevents the corresponding column driver 110 from transmitting pixel data to a pixel 102 that resides in the column 106, and the state of the pixel 102 remains unchanged (e.g., does not "refresh"). The column driver 110 may open or close the switch based on the refresh status that is sent by the SPC 108 in a signal 116.

The display device 100 has been simplified for ease of illustration. Those skilled in the art will appreciate that the display device 100 may include addition components, such as controllers, transistors, and capacitors, which are not illustrated.

In operation, an image may be refreshed on the display device 100 beginning with a "vertical sync." The first row driver $112_1$ will drive a refresh operation along the first row $104_1$ of pixels 102. The first column driver $110_1$ will determine whether the first pixel (e.g., top most, left most) pixel $102_1$, which is located at the intersection of the first row $104_1$ and the first column $106_1$ is to be refreshed based in the refresh status transmitted by the SPC 108. If the first pixel $102_1$ is to be refreshed, then the first column driver $110_1$ will transmit the corresponding pixel data for the first pixel $102_1$ to cause the first pixel $102_1$ to refresh. If the first pixel $102_1$ is not to be refreshed, then the first column driver $110_1$ will transmit no pixel data for the first pixel $102_1$ to cause the first pixel $102_1$ to not refresh (e.g., the first column $106_1$ will be held in tristate mode).

Image refresh continues along the first row $104_1$ (e.g., moving left to right) to selectively transfer pixel data to the remaining pixels 102 in the first row $104_1$, until the pixel at the intersection of the first row $104_1$ and the last column $106_k$ is reached. A "horizontal sync" command may then reset the column to the first column $106_1$ and increment the row to the next row (i.e., the second row $104_2$). Image refresh may resume with the first (e.g., left most) pixel of the second row $104_2$, which is located at the intersection of the second row $104_2$ and the first column $106_1$ Image refresh continues along the second row $104_2$ (e.g., moving left to right) to transfer pixel data to the remaining pixels 102 in the second row $104_2$, until the pixel at the intersection of the second row $104_2$ and the last column $106_k$ is reached. Image refresh may continue in this manner, row-by-row, until the entire image is refreshed.

Figure 2:
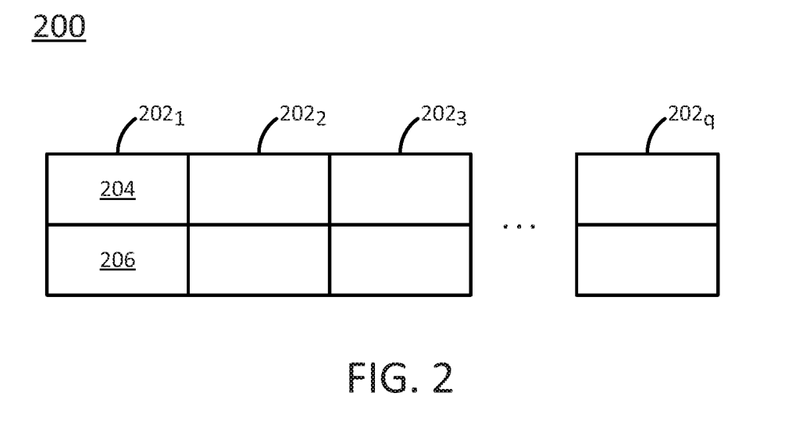
FIG. 2 illustrates an example signal that may be sent to a display device by a graphics controller.

FIG. 2 illustrates an example signal 200 that may be sent to a display device by a graphics controller. The signal 200 may be similar to the first signal 114 illustrated in FIG. 1. As illustrated in FIG. 2, the signal 200 may include a plurality of packets $202_1$-$202_q$ (hereinafter individually referred to as a "packet 202" or collectively referred to as "packets 202"). The plurality of packets 202 includes at least a first packet $202_1$ and a second packet $202_2$.

In the example shown in FIG. 2, each packet 202 includes a first field 204 and a second field 206 (shown in packet $202_1$ by way of example). The first field 204 may contain pixel data for a specific pixel of a display device to which the packet 202 corresponds. The second field 206 may contain a refresh status for the pixel to which the packet 202 corresponds which indicates whether the pixel is to be refreshed or not. The refresh status may be indicated by an indicator such as "refresh/don't refresh," "yes/no" (e.g., where "yes" indicates that the pixel should be refreshed, and "no" indicates that the pixel should not be refreshed), "1/0" (e.g., where "1" indicates that the pixel should be refreshed, and "0" indicates that the pixel should not be refreshed) or any other indicator that can be extracted from the signal 200 by a display device. In one example, one or both of the first field 204 and the second field 206 may be contained in a payload of the packet 202. In another example, one or both of the first field 204 and the second field 206 may be contained in a header or footer of the packet 202.

Thus, according to the example signal 200, if the refresh status for a pixel corresponding to a packet 202 indicates that the pixel is to be refreshed, then the display device will refresh the pixel (e.g., according to the example described above) using the pixel data contained in the packet 202. Alternatively, if the refresh status for the pixel indicates that the pixel is not to be refreshed, then the display device will not refresh the pixel. In one example, if the second field 206 contains a refresh status indicating that the pixel is not to be refreshed, then the corresponding first field 204 may be empty (e.g., may contain no pixel data for the pixel). In this way, the refresh rate of individual pixels may be varied in a manner that supports foveated rendering of an image.

Moreover, if no pixel data is sent for pixels that are not to be refreshed, then the amount of data sent over the link between the image source (e.g., graphics controller) and the display device may be reduced. As such, valuable link bandwidth may be conserved, allowing for improved image fidelity and faster image rendering. In addition, the power consumption of the display device may be reduced by avoiding a constant refresh of every pixel of the display.

Figure 3:
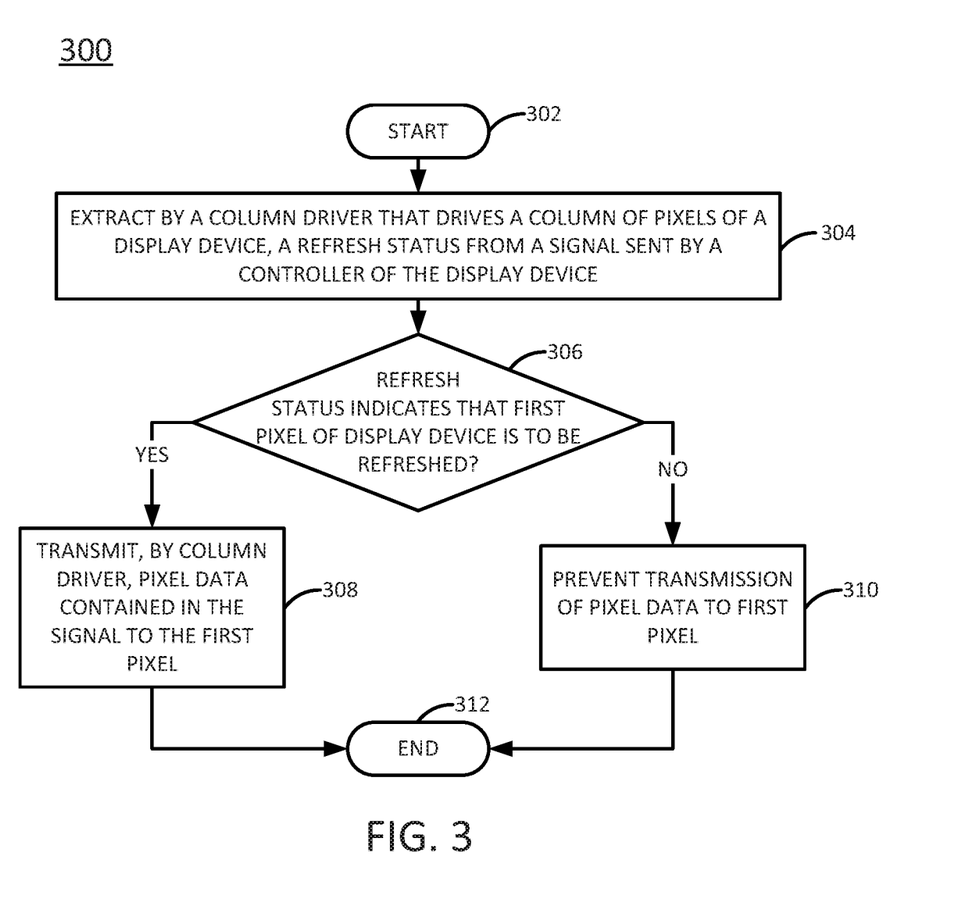
FIG. 3 is a flow diagram illustrating an example method for rendering an image on a display device.
Figure 5:
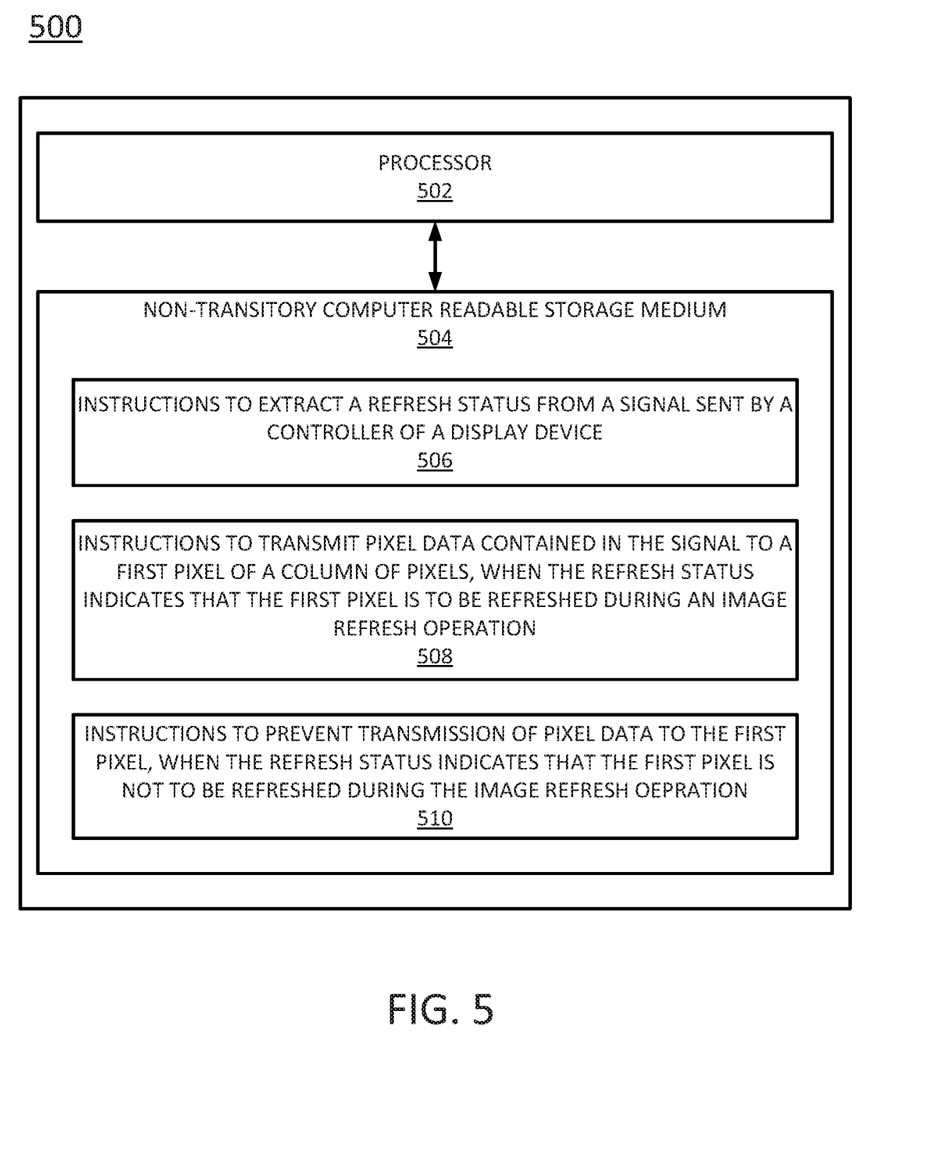
FIG. 5 illustrates an example of an apparatus.

FIG. 3 is a flow diagram illustrating an example method 300 for rendering an image on a display device. The method 300 may be performed, for instance, by each of the column drivers 110 of the display device 100 of FIG. 1, or by a device as illustrated in FIG. 5. As such, reference may be made in the discussion of the method 300 to various components of the display device 100. Such references are made for the sake of example, however, and do not limit the means by which the method 300 may be implemented.

The method 300 begins in block 302. In block 304, a refresh status is extracted from a signal sent by a controller of a display device. The controller in this case may be a serial-to-parallel converter (SPC) that receives serial pixel data from a graphics controller (which may be connected via a wired cable and/or a wireless network connection to the display device). In one example, the refresh status indicates whether a first pixel of the display device is to be refreshed during an image refresh operation of the display device.

In block 306, it is determined whether the refresh status extracted in block 304 indicates that a first pixel of the display device should be refreshed during an image refresh operation of the display device. As discussed above in connection with FIG. 2, the refresh status may be indicated by an indicator such as "refresh/don't refresh," "yes/no" (e.g., where "yes" indicates that the pixel should be refreshed, and "no" indicates that the pixel should not be refreshed), "1/0" (e.g., where "1" indicates that the pixel should be refreshed, and "0" indicates that the pixel should not be refreshed) or any other indicator.

If it is determined in block 306 that the refresh status indicates that the first pixel should be refreshed, then the method 300 continues to block 308. In block 308, and responsive to the refresh status, pixel data contained in the signal received from the controller is transmitted to the first pixel. When rendered by the first pixel during the refresh operation, the pixel data will change a state of the first pixel (i.e., "refresh" the first pixel). In one example, the pixel data is transmitted to the first pixel by closing a switch, allowing transmission of the pixel data from a column driver of a column in which the first pixel resides to the first pixel.

If, on the other hand, it is determined in block 306 that the refresh status indicates that the first pixel should not be refreshed, then the method 300 continues to block 310. In block 310, and responsive to the refresh status, transmission of pixel data to the first pixel is prevented. In one example, transmission of pixel data to the first pixel is prevented by opening a switch, preventing transmission of pixel data from a column driver of a column in which the first pixel resides to the first pixel. In one example, opening of the switch effectively holds the column corresponding to the column driver in tristate mode.

The method 300 ends in block 312.

The method 300 may repeat as pixel data is selectively transmitted or prevented from being transmitted to additional pixels of the display, and as additional refresh statuses and pixel data are extracted from the signal. For instance, as noted above, the signal may include refresh statuses that change the refresh rate along a row (e.g., changing from one or more pixels not being refreshed to one or more pixels being refreshed, and vice versa).

Figure 4:
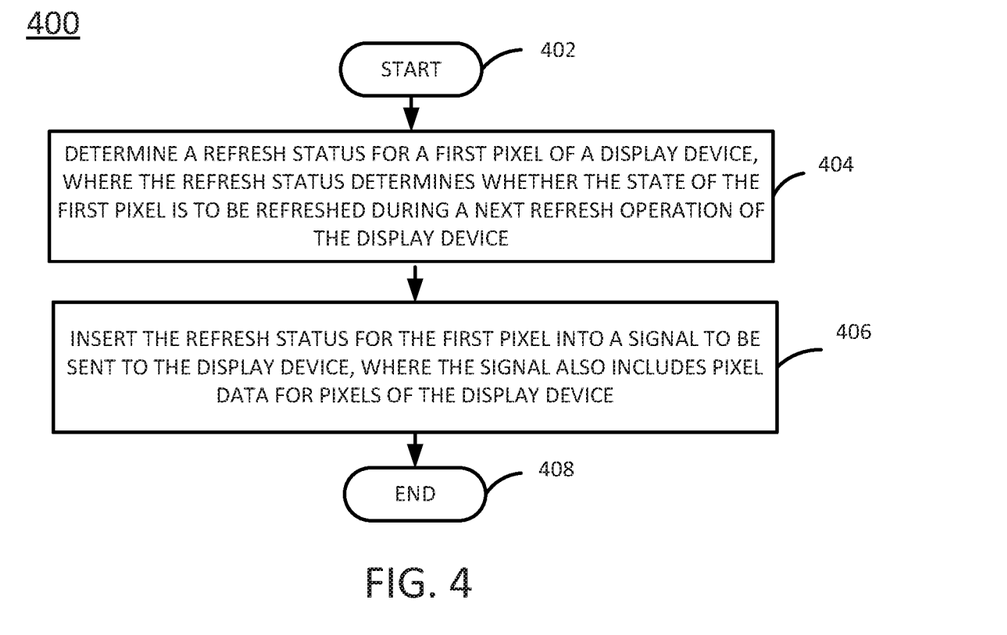
FIG. 4 is a flow diagram illustrating an example method 400 for generating pixel data that may be used by a display device to render an image.

FIG. 4 is a flow diagram illustrating an example method 400 for generating pixel data that may be used by a display device to render an image. The method 400 may be performed, for instance, by a graphics controller that is connected to a display device such as the display device 100 of FIG. 1, or by a device as illustrated in FIG. 5.

The method 400 begins in block 402. In block 404, a refresh status for a first pixel of a remote display device (e.g., a display device which may be connected via a wired cable and/or a wireless network connection to the graphics controller) is determined. The refresh status determines whether the state of the first pixel is to be changed (or "refreshed") during a next image refresh operation of the display device.

In one example, whether the first pixel is to be refreshed or not may depend on the location of the first pixel on the display device and/or on a direction of a viewers gaze. For instance, if the graphics controller is able to track the direction of the viewer's gaze, then the graphics controller may employ a foveated rendering technique to reduce link bandwidth between the graphics controller and the display device. For instance, the graphics controller may determine that if the first pixel is located in a region of the display device toward which the user's gaze is directed, then the first pixel should be refreshed during the next image refresh operation. Alternatively, if the first pixel is located in a region of the display that is on the periphery of the users gaze, then the graphics controller may determine that the first pixel should not be refreshed during the next image refresh operation.

In block 406, the refresh status for the first pixel is inserted in a signal to be sent to the display device. The signal also includes pixel data for pixels of the display device (including the first pixel, if it is to be refreshed). As discussed above in connection with FIG. 2, the refresh status may be indicated by an indicator such as "refresh/don't refresh," "yes/no" (e.g., where "yes" indicates that the pixel should be refreshed, and "no" indicates that the pixel should not be refreshed), "1/0" (e.g., where "1" indicates that the pixel should be refreshed, and "0" indicates that the pixel should not be refreshed) or any other indicator. The refresh status will control whether the display device refreshes the first pixel during the next image refresh operation.

The method 400 ends in block 410.

The method 400 may repeat pixel-by-pixel as pixel data is generated for each row of the display device. For instance, as noted above, the signal may include refresh statuses that change the refresh rate along a row (e.g., changing from one or more pixels not being refreshed to one or more pixels being refreshed, and vice versa).

It should be noted that although not explicitly specified, some of the blocks, functions, or operations of the methods 300 and 400 described above may include storing, displaying and/or outputting for a particular application. In other words, any data, records, fields, and/or intermediate results discussed in the methods 300 and 400 can be stored, displayed, and/or outputted to another device depending on the particular application. Furthermore, blocks, functions, or operations in FIGS. 3 and 4 that recite a determining operation, or involve a decision, do not necessarily imply that both branches of the determining operation are practiced.

As discussed above, examples of the present disclosure may be useful to enable foveated rendering techniques, to reduce link bandwidth between a remote graphics controller and a display device, and/or to reduce power consumption by display devices. For instance, display areas outside of a viewer's center of gaze, display areas containing pixels with relatively stable states, and other display areas may be refreshed less frequently than other display areas. A graphics controller may determine the refresh rate for each individual pixel, as discussed in connection with FIG. 4. Examples of the present invention may enable flexibility in image rendering in other ways as well.

For instance, a first frame of a sequence of images and an immediately subsequent second frame of the sequence may include areas of overlap (i.e., areas in common between the end column of the first frame and the start column of the second frame). Examples of the present invention would allow the areas of overlap to be refreshed more frequently than the areas of non-overlap, thereby reducing power and/or bandwidth consumption. A graphics controller may identify the areas of overlap and non-overlap and determine the appropriate refresh rates for the associated pixels, as discussed in connection with FIG. 4.

In another example, examples of the present disclosure could be implemented to reduce power consumption by a touch screen device in communication with an active stylus. For instance, it may be desirable for regions of the touch screen device's display to respond in substantially real time when contacted by a stylus (e.g., such that an image drawn by the stylus appears on the display as quickly as an image drawn by a pen on paper would). The stylus may report at a higher rate (e.g., 266 Hz) than the operating rate of the display (e.g., 60 Hz). In this case, the areas of the display that are directly contacted by the stylus could be refreshed more frequently than the areas of the display that are not directly contacted by the stylus. A graphics controller of the touch screen device may identify the areas that are directly contacted by the stylus and determine the appropriate refresh rates for the associated pixels, as discussed in connection with FIG. 4.

In another example, examples of the present disclosure could be implemented to enable a "quiet" refresh of a display device. For instance, electrical activity caused by refresh operations may generate noise that may interfere with the performance of one or more sensors (e.g., fingerprint sensors, card readers, or the like) behind the display surface. By lowering the amount of activity (e.g., the refresh rate) in certain regions of the display, noise interference may be reduced. A graphics controller may identify the regions of the display that may affect the sensors and determine the appropriate refresh rates for the associated pixels, as discussed in connection with FIG. 4.

In another example, examples of the present disclosure may be implemented to reduce the refresh rate of pixels that are less prone to flicker. For instance, in liquid crystal displays, pixels that display "white" or "black" tend to be less prone to flicker than pixels that display "gray," since the voltage states of the "white" or "black" pixels are highly saturated (i.e., small variations in the voltage applied to the pixels tends not to translate into noticeable luminance variation). Thus, for example, a computer display displaying a word processing document may display the document as a white background with grayscale text and/or images. The text and/or images may be refreshed more frequently than the background in this case. A graphics controller may identify propensity of individual pixels for flicker and determine the appropriate refresh rates for the pixels, as discussed in connection with FIG. 4.

FIG. 5 illustrates an example of an apparatus 500. In one example, the apparatus 500 may be one of the column drivers 110 of FIG. 1. In one example, the apparatus 500 may include a processor 502 and a non-transitory machine readable storage medium 504. The non-transitory machine readable storage medium 504 may include instructions 506, 508, and 510 that, when executed by the processor 502, cause the processor 502 to perform various functions.

The instructions 506 may include instructions to extract a refresh status from a signal sent by a controller of a display device. The controller may be a serial to parallel converter (SPC) of the display device that converts serial pixel data from a graphics controller to parallelized pixel data. The instructions 508 may include instructions to transmit pixel data contained in the signal to a first pixel of a column of pixels, when the refresh status indicates that the first pixel is to be refreshed during an image refresh operation. The instructions 510 may include instructions to prevent transmission of pixel data to the first pixel, when the refresh status indicates that the first pixel is not to be refreshed during the image refresh operation.

Figure 6:
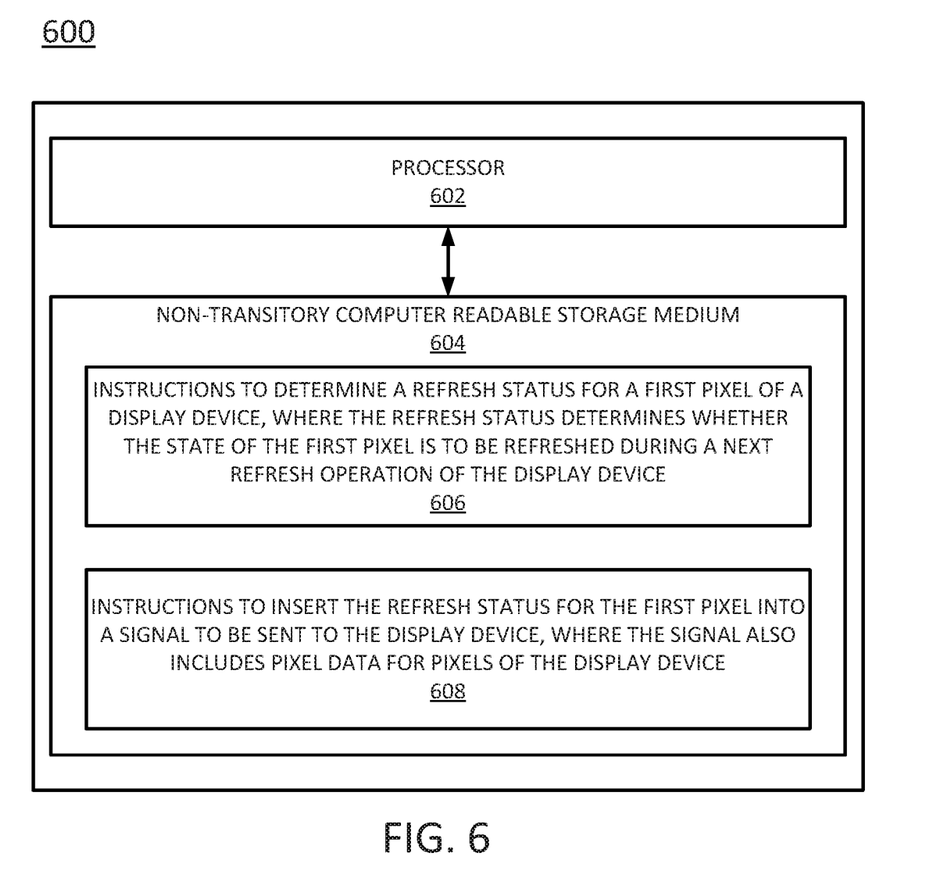
FIG. 6 illustrates an example of an apparatus.

FIG. 6 illustrates an example of an apparatus 600. In one example, the apparatus 600 may be a graphics controller. The graphics controller may be coupled remotely to a display device (e.g., via a wired and/or wireless network connection), or the graphics controller may be integrated into the display device. In one example, the apparatus 600 may include a processor 602 and a non-transitory machine readable storage medium 604. The non-transitory machine readable storage medium 604 may include instructions 606 and 608 that, when executed by the processor 602, cause the processor 602 to perform various functions.

The instructions 606 may include instructions to determine a refresh status for a first pixel of a display device. The refresh status determines whether the state of the first pixel is to be changed (or "refreshed") during a next image refresh operation of the display device. The instructions 608 may include instructions to insert the refresh status for the first pixel in a signal to be sent to the display device. The signal also includes pixel data for pixels of the display device (including the first pixel, if it is to be refreshed).

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:
1. A display device, comprising:
a plurality of pixels arranged in a plurality of rows and a plurality of columns, wherein the plurality of columns includes at least a first column, the plurality of rows includes at least a first row, and the plurality of pixels includes at least a first pixel residing at an intersection of the first row and the first column;
a serial-to-parallel converter to extract pixel data from a first field of a data packet sent by a graphics controller and to extract a command from a second field of the data packet indicating whether the first pixel is to be refreshed;

a row driver coupled to the first row to initiate a refresh of those pixels of the plurality of pixels residing in the first row based on the pixel data;

a column driver coupled between the serial-to-parallel converter and the first column to transmit the pixel data to the first column; and a switch coupled to the column driver to allow transmission of the pixel data to the first pixel during the refresh when the command indicates that the first pixel is to be refreshed and to prevent transmission of the pixel data to the first pixel during the refresh when the command indicates that the first pixel is not to be refreshed.

2. The display device of claim 1, wherein the display device is a head mounted display.

3. The display device of claim 1, wherein the display device is a touchscreen device in communication with an active stylus.

4. The display device of claim 1, wherein the switch closes to allow transmission of the pixel data to the first pixel and opens to prevent transmission of the pixel data to the first pixel.

5. The display device of claim 4, wherein opening of the switch causes the first column to be held in a tristate mode.

6. A method, comprising:
extracting, by a column driver that drives a column of pixels of a display device, a refresh status from a second field of a first data packet sent by a controller of the display device;
determining, by the column driver, that the refresh status indicates that a first pixel of the column of pixels is to be refreshed during an image refresh operation; and
transmitting, by the column driver, pixel data contained in a first field of the first data packet to the first pixel of the column of pixels in response to the determining that the refresh status indicates that a first pixel of the column of pixels is to be refreshed.

7. The method of claim 6, wherein the display device is a head mounted display.

8. The method of claim 6, wherein the first pixel resides at an intersection of the column of pixels and a row of pixels, and wherein the refresh status causes the first pixel to be refreshed at a different refresh rate than other pixels residing in the row of pixels.

9. The method of claim 6, further comprising:
extracting, by the column driver, a refresh status from a second field of a second data packet sent by the controller of the display device;
determining, by the column driver, that the refresh status from the second field of the second data packet indicates that a second pixel of the column of pixels is not to be refreshed during the image refresh operation; and
preventing transmission, by the column driver, of pixel data to the second pixel of the column of pixels in response to determining that the refresh status from the second field of the second data packet indicates that the second pixel is not to be refreshed.

10. The method of claim 9, wherein the second pixel is located in a region of the display device that is on a periphery of a viewer's gaze.

11. The method of claim 10, wherein a fidelity of an image displayed on the display device is lower in the region relative to other regions of the display device.

12. The method of claim 6, wherein the second field of the first data packet contains a yes/no indicator to indicate the refresh status.

13. The method of claim 6, wherein the second field of the first data packet contains a 1/0 indicator to indicate the refresh status, where 1 indicates that the first pixel should be refreshed, and 0 indicates that the first pixel should not be refreshed.

14. The method of claim 6, wherein at least one selected from: the first field of the first data packet and the second field of the first data packet is contained in a payload of the first data packet.

15. The method of claim 6, wherein at least one selected from: the first field of the first data packet and the second field of the first data packet is contained in a header or footer of the first data packet.

16. A non-transitory machine-readable storage medium encoded with instructions executable by a processor, the machine-readable storage medium comprising:
instructions to extract a refresh status from a second field of a first data packet sent by a controller of a display device;
instructions to determine that the refresh status indicates that a first pixel of a column of pixels is to be refreshed during an image refresh operation; and
instructions to transmit pixel data contained in a first field of the first data packet to the first pixel in response to a determination that the refresh status indicates that the first pixel is to be refreshed during an image refresh operation.

17. The non-transitory machine-readable storage medium of claim 16, wherein the display device is a head mounted display.

18. The non-transitory machine-readable storage medium of claim 16, wherein the first pixel is located in a region of the display device toward which a viewer's gaze is directed.

19. The non-transitory machine-readable storage medium of claim 18, wherein a fidelity of an image displayed on the display device is greater in the region relative to other regions of the display device which are on a periphery of the viewer's gaze.

20. The non-transitory machine-readable storage medium of claim 16, wherein the first pixel resides at an intersection of the column of pixels and a row of pixels, and wherein the refresh status causes the first pixel to be refreshed at a different refresh rate than other pixels residing in the row of pixels.

* * * * *